Figure 1:
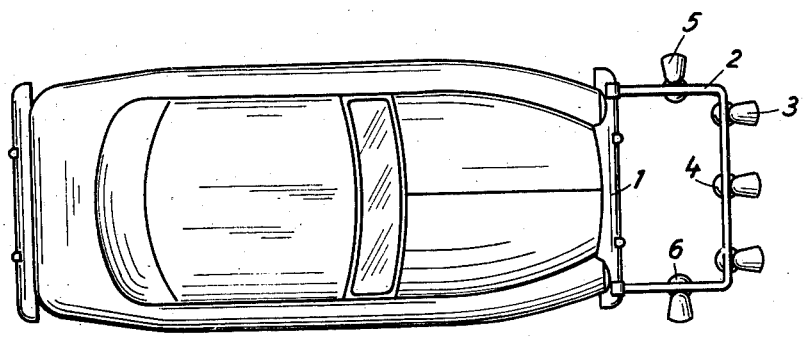

April 30, 1963   D. SCHMIDT   3,088,022
SUPPLEMENTARY LIGHTING ARRANGEMENT FOR VEHICLES
Filed Dec. 23, 1958

Inventor
Daniel Schmidt
By
Diggins & Le Blanc
attorneys

United States Patent Office 3,088,022
Patented Apr. 30, 1963

3,088,022
SUPPLEMENTARY LIGHTING ARRANGEMENT
FOR VEHICLES
Daniel Schmidt, Erprather Muhlen, Neuss-
Weckhoven, Germany
Filed Dec. 23, 1958, Ser. No. 782,530
Claims priority, application Germany Dec. 27, 1957
2 Claims. (Cl. 240—7.1)

It is a known fact that the problem of vehicle lighting for the purpose of orientation under bad visibility and road conditions has hitherto only been solved in a very unsatisfactory manner. The conventional so-called "fog-lamps" in the form of wide beam projectors are invariably so near the vehicle and placed so low down that, in the event of visibility being impaired by fog, they provide the driver practically no assistance, which becomes particularly apparent by the fact that the driver when driving through a thick bank of fog with his fog-lights switched on, does not even notice whether his fog-lights are switched on or not when he emerges from the fog bank.

The present invention produces a remedy for this disadvantage by lamps built ahead of the vehicle actually or approximately within the range of vision of the driver and projecting their light vertically downwards on to the track and also inclined downwards toward the track. Owing to the lamps being arranged within the range of vision of the driver he can not only see the lamps but also the light beam they project and the track illuminated thereby, the track being lighted by the vertical beams on the one hand and on a restricted width by the lamps projecting their light downwards at an incline onto the track, so that even in the case of very dense fog preventing any beam penetration, the track itself still remains lighted for the driver to see. Consequently he knows how far he is still on the track and is enabled to keep to the right side of the road legally prescribed for him. In the case of a bad road surface he can always keep an eye on the track directly in front of his vehicle, which otherwise he can only do within a certain distance from the vehicle even in the case of good visibility.

The orientation lamps are also preferably built ahead on both sides within the profile of the vehicle and so arranged that the lamps illuminating downwards at an incline project their beam in a transverse or approximately transverse direction to the vehicle. These lamps, which owing to the direction of the light beam they project do not blind or dazzle oncoming vehicles, increase the possibility of keeping in view the edges of the track or road and of evading any obstacle which may suddenly become apparent thereon.

Both the lamps projecting their light vertically downwards and also those projecting their beam downwards at an incline on to the track can be mounted in the same carrier so that the fixing of the forwardly extending structure is relatively simple. The carrier may be so constructed that it can be fitted without difficulty on the vehicle and removed therefrom, it being for example clamped on the bumper bar. This is of special advantage when it is desired to fit existing vehicles with the supplementary lighting arrangement according to the invention.

It is advisable to construct the carrier for the lamps so that it can be pulled from its inoperative position, in which it is retracted on to the vehicle, into its position for use ahead of the vehicle. This presents the advantage that a front structure carrying the lamps only becomes apparent as a front structure when required for use when the speed is invariably reduced.

It is also advantageous to equip the lamp carrier with position lamps which indicate the boundary of the vehicle to oncoming vehicles.

The orientation lamps or their carrier are or is preferably arranged at the height of the axis passing through the centers of the wheels or at the height of the bumper bar. This ensures that, while maintaining the necessary clearance from the track or road, the lamps are not too far away from the track. If the lamps are at too great a distance from the track the desired effect might be impaired.

A possible embodiment of the invention consists in that the lamps which are normally fitted on the vehicle, can be pulled out and fitted so that their light beam can be directed downwards at an incline towards the track, for example by providing a swivel arrangement for the lamps.

The supplementary lighting arrangement according to the invention can also be fitted at the rear end of the vehicle. In this case red light is preferably chosen for the lamps so as to prevent rearward dazzling and also not to detract from the object of rear lighting in the form of warning light.

It is also possible according to the invention to mount the orientation lamps at the side of the vehicle or laterally of the windshield.

The strength of the bulbs used for the lamps will depend upon the actually existing traffic regulations. Coloured and/or ground glass can be used for the lamps. The lamps can be also equipped for constant or intermittent lighting. The mudguards can also be used for fitting the supplementary lighting arrangement.

Figure 2:
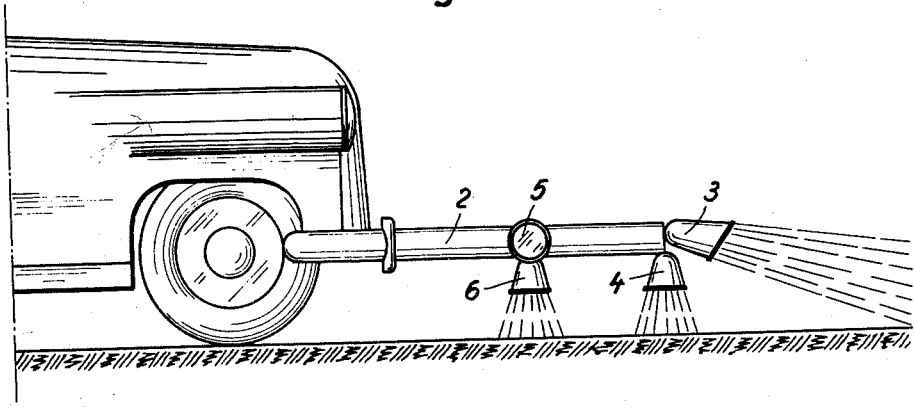

An embodiment of the invention is illustrated by way of example in the accompanying drawing, in which FIG. 1 shows a vehicle in top plan view, and FIG. 2 the front part of the vehicle in side elevation on a larger scale.

A frame 2 projecting in forward direction is mounted on the vehicle at the height of the bumper bar 1. Lamps 3 are mounted on this frame facing in the direction of travel and throw their beam downwards at an incline on to the track. Below these lamps 3 are additional lamps 4 which project their beam vertically downwards on to the track. The lamps 3 and 4 are at such distance ahead of the vehicle that they can be seen from the driver's seat.

Laterally on the frame 2 lamps 5 are mounted on both sides and project a beam of light downwards at an incline on to the track in transverse direction to the vehicle. Below the lamps 5 are other lamps 6 projecting their beam vertically downwards on to the track.

The lamps 3 and 4 as well as the lamps 5 and 6 can be assembled in one housing.

All the lamps illuminate at the same time. It is, however, also possible to arrange for the lamps to be selectively switched on in combinations or individually, the side lamps being switched on and off independently of the front lamps. Moreover, the side lamps can also be switched on and off on each side.

The forwardly extending structure can be adapted to the shape of the front of the vehicle. It can also form a shock absorber or fender in front of the lamps.

I claim:

1. A supplementary lighting arrangement for wheeled vehicles having a windshield for use in bad visibility and road conditions comprising in combination, a U-shaped support mounted on the front of said vehicle and extending horizontally outwards therefrom, a plurality of lamps mounted on said support in an area of said support visible from said windshield, a first portion of said plurality of lamps mounted perpendicularly to said support whereby they project their beams of light vertically downward onto the road, a second portion of said plurality of lamps mounted at an angle with the horizontal and directed forwardly relative to vehicle movement whereby they project their beams of light downward at an incline and illuminate the road in front of said support, and a third portion of said plurality of lamps mounted at an angle with the horizontal and directed transversely relative to vehicle movement whereby they project their beams of light downward at an incline and illuminate the road to the sides of said support.

2. A supplementary lighting arrangement for wheeled vehicles having a windshield and a bumper bar for use in bad visibility and road conditions comprising in combination, a U-shaped support having two side members extending forwardly from the front of the vehicle and a cross-member connecting the outer extremities of said side members, said support extending horizontally and at the height of said bumper bar, a first and second lamp mounted on a first of said side members, said first lamp mounted perpendicularly to said support whereby it directs its beam of light vertically downward onto the road, said second lamp mounted obliquely to said support and downwardly whereby it illuminates the road to one side of said support, a third and fourth lamp mounted on said cross-member, said third lamp mounted perpendicularly to said support whereby it directs its beam of light vertically downward onto the road, said fourth lamp mounted obliquely to said support and downwardly whereby it illuminates the road in front of said support, a fifth and sixth lamp mounted on a second of said side members, said fifth lamp mounted perpendicularly to said support whereby it directs its beam of light vertically downward onto the road, said sixth lamp mounted obliquely to said support and downwardly whereby it illuminates the road to the other side of said support, said first, second, third, fourth, fifth and sixth lamps being visible from said windshield.

References Cited in the file of this patent
UNITED STATES PATENTS

| | | |
|---|---|---|
| 1,818,126 | Germain | Aug. 11, 1931 |
| 2,214,447 | Bave | Sept. 10, 1940 |
| 2,325,216 | Barnes | July 27, 1943 |
| 2,651,028 | Dupree | Sept. 1, 1953 |
| 2,796,515 | Waskie | June 18, 1957 |

FOREIGN PATENTS

| | | |
|---|---|---|
| 507,447 | France | June 23, 1920 |